(12) United States Patent
Koga et al.

(10) Patent No.: US 6,515,440 B2
(45) Date of Patent: Feb. 4, 2003

(54) DEPARTURE CONTROL SYSTEM USING SIMULATED PHASE

(75) Inventors: Syunsaku Koga, Nagoya (JP); Junichi Kitano, Nagoya (JP)

(73) Assignees: Central Japan Railway Company, Nagoya (JP); Railway Technical Research Institute, Kokubunji (JP)

(*) Notice: Subject to any disclaimer, the term of this patent is extended or adjusted under 35 U.S.C. 154(b) by 91 days.

(21) Appl. No.: 09/816,057

(22) Filed: Mar. 23, 2001

(65) Prior Publication Data

US 2002/0047676 A1 Apr. 25, 2002

(30) Foreign Application Priority Data

Mar. 24, 2000 (JP) .................................... 2000-084151

(51) Int. Cl.[7] ................................................ H02P 1/46
(52) U.S. Cl. ...................... 318/135; 318/700; 318/687; 318/715
(58) Field of Search ................................ 318/135, 687, 318/138, 254, 437, 439, 685, 696, 700, 701, 705, 712, 715

(56) References Cited

U.S. PATENT DOCUMENTS

| 5,969,496 A | * | 10/1999 | Yamada et al. | ............. 318/715 |
| 6,005,365 A | * | 12/1999 | Kaneko et al. | ............. 318/700 |
| 6,037,739 A | * | 3/2000 | Hartramph et al. | ......... 318/687 |
| 6,281,656 B1 | * | 8/2001 | Masaki et al. | ............. 318/700 |

* cited by examiner

*Primary Examiner*—Nestor Ramirez
*Assistant Examiner*—Judson H. Jones
(74) *Attorney, Agent, or Firm*—Davis & Bujold, P.L.L.C.

(57) ABSTRACT

In the control system, a propulsion force is computed by a propulsion force computing unit based on a current command value outputted from a speed controller, an acceleration is computed by an acceleration computing unit based on the propulsion force and a running resistance outputted from a running resistance computing unit, a speed is computed by a speed computing unit based on the acceleration, and a simulated phase reference value is computed by a phase computing unit. Then, the simulated phase is computed by adding, at a simulated phase computing unit, a predetermined phase delay (e.g. 30 degrees) to the simulated phase reference value. The addition of the phase delay results in generation of synchronizing force in the LSM and thus little deviation between the simulated phase and the actual phase.

4 Claims, 7 Drawing Sheets

UNDERLINE: PRIOR ART

UNDERLINE: PRIOR ART

DEPARTURE CONTROL SYSTEM USING SIMULATED PHASE

FIELD OF THE INVENTION

The present invention relates to a control system for a linear synchronous motor vehicle, and more particularly to a departure control system using a simulated phase.

BACKGROUND OF THE INVENTION

A known example of conventional control systems for a linear synchronous motor (hereinafter referred to as "LSM") vehicle comprises, as shown in FIG. 4, a propulsion coil 61 provided along a guideway on a ground; a field coil 62a provided on a vehicle 62 so as to face the propulsion coil 61; a speed controller 63 for outputting a current command value I* computed by proportional integral operation of the deviation between a speed command value v* and the actual speed v; a converter controller 64 for performing proportional integral operation of the deviation between the current command value I* and a coil current I flowing through the propulsion coil 61 and outputting a voltage command value V* with a sine wave in synchronism with a position detecting phase θp as a phase reference to indicate the position of the vehicle; a power converter 65 for outputting a three-phase output voltage V in accordance with the voltage command value V* to the propulsion coil 61 through a feeder 66; a current detector 67 for detecting the coil current I flowing through the propulsion coil 61; a cross induction line 68a arranged along the track so as to obtain information about the vehicle position; a position detector 68 for detecting a relative position of the field coil 62a to the propulsion coil 61 based on a signal generated in the cross induction line 68a and outputting the position detecting phase θp; and a speed detector 69 for performing operation of an actual speed v necessary for speed control from the position detecting phase θp and outputting the actual speed.

The propulsion coil 61, particularly as shown in FIG. 5A, is composed of coil sections, such as 71A1, 71B1, and 71C1 having a prescribed length and a plurality of groups of coils for propulsion therein, which are arranged on both sides of the vehicle 62 such that respective coil sections on one side are shifted by half of their length relative to respective coil sections on the other side. As shown in FIG. 5B, each coil section comprises a plurality of groups of coils for propulsion of three phases, i.e. U-phase, V-phase, and W-phase, respectively, which groups are arranged along the forward direction of the vehicle. By supplying three-phase alternating current to these groups of coils, shifting magnetic field is generated. A phase reference is predetermined by using the length of a group of coils for propulsion of 2.7 m as one cycle (360°) of an electrical angle, and information about the vehicle position is obtained by detecting the phase reference with the position detector 68.

The feeder 66 for supplying electricity, or outputting output voltage V, from the power converter 65 to each coil section consists of three feeder cables corresponding to three inverters 65A, 65B, and 65C, respectively, contained in the power converter 65. By controlling feeder section switches such as 72A1, 72B1, 72C1 ... (omitted in FIG. 4) separately, electricity is supplied only to the three lines of coil sections in the vicinity of the running vehicle 62.

For example, when the vehicle 62 runs in the right direction as shown in FIG. 5A, three feeder section switches 72C1, 72A2, and 72B2 are closed and electricity is supplied to the coil section 71C1 through a C-line inverter 65C, to the coil section 71A2 through an A-line inverter 65A, and to the coil section 71B2 through a B-line inverter 65B, respectively. When the vehicle 62 reaches the position corresponding to the coil section 71B2, a feeder section switch 72C2 is closed while the feeder section switch 72C1 is opened, with the result that power supply is stopped for the coil section 71C1 and started for the coil section 71C2 instead.

An LSM vehicle is driven by propulsion force generated by the interaction between a magnetic field generated by the field coil 62a, which is a superconductive coil, and a magnetic field generated in the propulsion coil 61 due to the three-phase output voltage V outputted from the power converter 65. To control driving of the LSM vehicle, the position detecting phase θp is inputted into the converter controller 64 as a phase reference indicating the position of the vehicle 62, and an actual speed v is computed by the speed detector 69 based on the position detecting phase θp. Therefore, accurate detection of the position detecting phase θp, i.e. the vehicle position, is required.

To fulfill this requirement, the cross induction line 68a is laid along the length of the track and a signal (an electric wave) is transmitted from the vehicle 62 to the cross induction line 68a. By processing a sine wave signal, which is generated in the cross induction line 68a due to the signal transmission from the vehicle 62, with the position detector 68, the position detecting phase θp is obtained. Thus, substantially accurate position detection is achieved.

However, the above-described method of detecting the position of the vehicle 62 requires accurate laying of the cross induction line 68a along the length of the track and maintenance thereof as well. It leads to a large amount of labor and high cost for construction and maintenance of the vehicle position detecting system.

To solve this problem, a method of detecting the vehicle position without providing a ground installation such as the cross induction line 68a has been thought out. In this method, electromotive force induced in the propulsion coil 61 due to the running of the vehicle 62 (hereinafter referred to as "speed electromotive force") is estimated, and a phase indicating the vehicle position (hereinafter referred to as "speed electromotive force phase") θe is obtained based on the estimated value. Specifically, in the control system for an LSM vehicle shown in FIG. 4, a speed electromotive force is estimated based on the output voltage V outputted from the power converter 65, the coil current I flowing through the propulsion coil 61, and a vehicle angular speed, then a speed electromotive force phase θe is computed from the estimated value of speed electromotive force.

As described above, by computing the speed electromotive force phase θe and using the same as the phase reference instead of the position detecting phase θp, ground installations such as the cross induction line 68a and the position detector 68 become unnecessary.

At a lower speed, however, the speed electromotive force phase θe is an unstable phase because the speed electromotive force is weak. Especially, at the time of departure, the speed electromotive force phase θe cannot be obtained because the speed electromotive force is not at all generated.

Then, it has been thought out that using a simulated phase as the phase reference at the time of departure when control based on the speed electromotive force phase is impossible. The simulated phase is obtained by the operation based on the current command value I* outputted from the speed controller 63. Specifically, as shown in FIG. 6, a propulsion force F is computed by an propulsion force computing unit 81 based on the current command value I*, and an acceleration a is computed by an acceleration computing unit 82 based on the propulsion force F and a running resistance D outputted from a running resistance computing unit 85. Then, a speed v is computed by a speed computing unit 83 based on the acceleration a and a simulated phase θn is computed by a phase computing unit 84.

As described above, even at the time of departure when the speed electromotive force θe cannot be obtained, the simulated θn can be obtained by carrying out an operation based on the current command value I*. Therefore, it is possible to obtain the phase reference without ground installations such as the cross induction line 68a, by using, for example, the simulated phase θn as the phase reference at the time of departure and the speed electromotive force phase θe as the phase reference at a predetermined speed or higher.

However, as shown in FIG. 6, the simulated phase θn is obtained merely by theoretical operation based on the current command value I* without using an actual phase reference (e.g. the position detecting phase θp), the output voltage V, or the like as a feedback signal. As a result, drive control of an LSM vehicle using the simulated phase θn as the phase reference, which is a so-called open loop control, is subject to disturbance and therefore prone to have unstable control characteristics.

In particular, although in computing of the propulsion force F by the propulsion force computing unit 81 and in computing of the running resistance D by the running resistance computing unit 85, various coefficients necessary for computing are determined based on the results of actual runs of a vehicle and simulations, running conditions of a vehicle actually vary each time it runs, and thus it is almost impossible to exactly match the propulsion force F and the running resistance D with the respective values at the time of actual runs, that is some errors are unavoidable. As a result, the deviation between the simulated phase θn ultimately computed and the actual phase becomes substantial.

Specifically, since the simulated θn different from the actual vehicle position (the actual phase) is used as the phase reference, the speed and the current command value I* suddenly change and make passengers feel uncomfortable when the phase reference is switched over from the simulated phase θn to another phase (the position detecting phase θp), for example, as shown in FIG. 7. Furthermore, an excessive phase deviation may cause loss of synchronism in the LSM and thereby make it impossible to control the LSM.

SUMMARY OF THE INVENTION

Wherefore, a principal object of the present invention is to provide a control system for an LSM vehicle using a simulated phase as a phase reference at the time of departure, which overcomes the above mentioned problems and realizes stable departure characteristics.

This and other objects are accomplished with a departure control system using a simulated phase in a control system for an LSM vehicle driven by propulsion force obtained by an interaction between the magnetic field produced in a propulsion coil arranged along a guideway on a ground by an output voltage outputted from power converting means and the magnetic field produced by a field coil provided on the vehicle so as to face the propulsion coil, the departure control system generating a phase reference as a vehicle position signal at the time of departure of the vehicle.

In the control system for an LSM vehicle, an output voltage is outputted to the propulsion coil by the power converting means based on the current command value I* outputted from speed control means and a phase reference in the same manner as in the above described conventional driving control system.

In this case, the phase reference as a vehicle position signal with respect to the LSM including the field coil and the propulsion coil is the relative position of the field coil to the propulsion coil indicated in the form of an electrical angle. For example, in the case of the LSM in which a movable magnetic field is produced by supplying three-phase alternating current to the propulsion coil, the distance between a U-phase coil and the field coil in the traveling direction of the vehicle is indicated in the form of an electrical angle, which is used as the phase reference.

In the departure control system according to the present invention, a simulated phase reference value is first computed by simulated phase reference value generating means by the operation based on the current command value I*. The simulated phase reference value is a theoretically computed distance (phase) the vehicle should travel when the vehicle is driven based on the current command value I* outputted from a speed controller. The simulated phase reference value is computed, for example, in the same way as in the prior art system (cf. FIG. 6). In this case, the simulated θn shown in FIG. 6 corresponds to the simulated phase reference value in the present invention. This computing, however, is simply based on a predetermined theoretic computing equation without taking disturbance or the like into consideration. Accordingly, if the simulated phase reference value is used as it is, as the phase reference, problems due to the deviation between the same and the actual phase will occur as described concerning the prior art system.

Therefore, according to the present invention, the simulated phase θn is computed by simulated phase generating means by adding a predetermined phase delay θd to the simulated phase reference value, and the simulated phase θn is outputted as the phase reference. In other words, due to addition of the predetermined phase delay θd, the obtained simulated phase θn is delayed from the actual phase. When control is started (that is, the vehicle is started) under this condition, the phase deviation between the simulated phase θn and the actual phase becomes little due to so-called synchronizing force to make the field coil move in the synchronizing speed of the LSM. The phase delay θd should be appropriately determined, for example, based on the results of actual vehicle runs and simulations so that the deviation between the simulated phase θn and the actual phase is reduced due to the synchronizing force.

The above simulated phase reference value is generated by a simulated phase reference value generating means provided with a propulsion force computing unit for computing propulsion force based on the current command value I*, a running resistance computing unit for computing running resistance based on the present speed, an acceleration computing unit for computing an acceleration based on the propulsion force and the running resistance, a speed computing unit for computing a speed based on the acceleration and a phase computing unit for computing the simulated phase reference value based on the speed. The speed obtained by the speed computing unit is used as the above mentioned present speed.

According to the above described departure control system, in which the simulated phase θn is computed by adding the phase delay θd to the simulated phase reference value theoretically obtained by the simulated phase reference value generating means and the simulated phase θn is used as the phase reference, the phase deviation between the simulated phase θn and the actual phase can be substantially reduced by the operation of synchronizing force. Thus, characteristics at the time of departure such as speed characteristics and acceleration characteristics are stabilized, that is, the speed, the acceleration, the current flowing through the propulsion coil, and the like hardly change even when the phase reference is switched over from the simulated phase θn to another phase, namely, the position detecting phase e p described referring to FIG. 4.

Although it is possible to reduce the phase deviation between the phase reference and the actual phase almost to zero (hereinafter referred to as "synchronize") by using the simulated phase θn to which the above mentioned phase delay θd is added as the phase reference, the phase deviation between the simulated θn and the actual phase still exists in the transition immediately after the departure, i.e. the time period until synchronization is achieved due to synchronizing force. In particular, the phase delay θd is equal to the phase deviation at the time of departure when the vehicle is stopped, and the phase deviation gradually decreases after the departure by the operation of synchronizing force until synchronization is finally achieved, then the synchronous state remains thereafter.

Accordingly, in the transition immediately after the departure, the phase reference is delayed from the actual phase, which leads to the determination that the vehicle is positioned behind the actual position, with the result that a propulsion force normally necessary for the vehicle (a propulsion force in accordance with the actual phase) cannot be obtained. Propulsion force generally depends on the amount of current flowing through the propulsion coil.

To compensate for a shortage of propulsion force caused in the transition immediately after the departure, it is preferable to increase the current command value I* by a predetermined amount with current command value correcting means, output the same as a current command correction value I*c, and output an output voltage to the propulsion coil and generate the simulated phase reference value with the simulated phase reference value generating means based on the current command correction value I*c instead of the current command value I*. The predetermined amount to be increased may be appropriately selected within the range where the propulsion force in accordance with the actual phase of the vehicle can be obtained.

According to the departure control system described above, since the shortage of propulsion force caused in the transition immediately after the departure until achievement of synchronization is compensated for by increasing the current command value I* by a predetermined amount, sufficient propulsion force can be obtained immediately after the departure and thus synchronization can be achieved earlier. Once synchronization is achieved after the phase deviation gradually decreases, the current command value I* may be used as it is. It is to be noted, however, that even if the current command correction value I*c is still used after the achievement of synchronization, excessive current is not to flow through the propulsion coil because the speed controller generally compares a predetermined speed pattern corresponding to the vehicle position with the actual vehicle speed, and outputs the current command value I* based on the comparison results.

In general, when output voltage is outputted using the phase reference having a phase deviation of dθ from the actual phase, the resulting propulsion force is cos dθ times the propulsion force required substantially. Then, the current command correction value I*c is obtained by performing the following operation based on the current command value I* and the phase delay θd with the current command value correction means.

$$I^*c = I^*/\cos \theta d$$

By obtaining the current command correction value I*c using the above equation, shortage of propulsion force due to the phase deviation θd at the time of departure can be sufficiently compensated for and early synchronization can be achieved while keeping the speed and the acceleration stabilized.

BRIEF DESCRIPTION OF THE DRAWINGS

The present invention will now be described, by way of example, with reference to the accompanying drawings, in which.

DETAILED DESCRIPTION OF THE INVENTION

Figure 1:
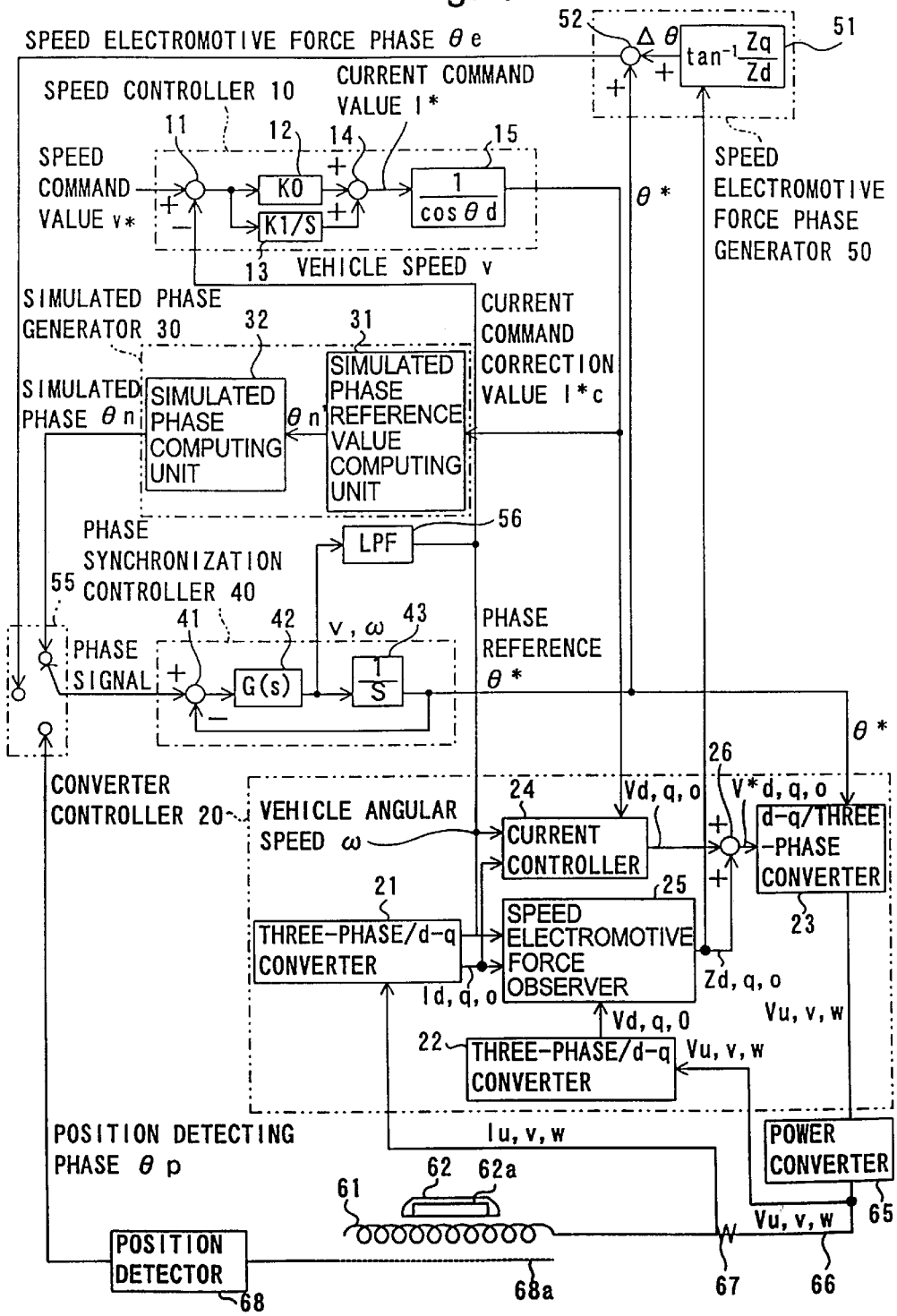
FIG. 1 is a schematic block diagram showing schematically the constitution of a control system for an LSM vehicle according to the present invention.

Referring to FIG. 1, a control system for an LSM vehicle mainly comprises a speed controller 10, a converter controller 20, a simulated phase generator 30, a phase synchronization controller 40, a speed electromotive force phase generator 50, an input phase switch 55, a propulsion coil 61, a field coil 62a, a power converter 65, a feeder 66, a current detector 67, a position detector 68, and a cross induction line 68a.

The speed controller 10 is designed as a proportional-integral (PI) control system so as to perform following control over a speed command value v* in a predetermined cycle. By performing proportional-integral operation of a speed deviation between the speed command value v* and a vehicle speed (actual speed) v, the speed controller 10 computes a current command correction value I*c and outputs the same. Specifically, the speed deviation between the speed command value v* and the vehicle speed v is calculated by an adder-subtracter 11, and proportional-integral operation of the speed deviation is performed by a proportionater 12 and an integrator 13, then the results of the operation are added by an adder-subtracter 14 to determine a current command value I*. Subsequently, the current command correction value I*c is computed by performing operation according to the following equation with a correction computing unit 15:

$$I^*c = I^*/\cos\theta d$$

The current command correction value I*c is a value (I*d, I*q, I*0) in dq0 rotary coordinate system. It is to be noted that θd in the above equation is a phase delay (see below for further details) added to a simulated phase reference θn' by a simulated phase computing unit 32.

The converter controller 20 compensates for a current deviation between the current command correction value I*c outputted from the speed controller 10 and the current flowing through the propulsion coil 61 (hereinafter referred to as "the coil current"), and adds the compensation for the speed electromotive force induced in the propulsion coil 61 to compute an output voltage V (Vu, Vv, Vw) toward the power converter 65.

Specifically, the coil current I (Iu, Iv, Iw) detected by the current detector 67 is converted into the current (Id, Iq, I0) in dq0 rotary coordinate system by a three-phase/d-q converter 21. Then, in the current controller 24, computed voltage value is obtained by the primary PI control based on a current deviation between the current (Id, Iq, I0) and the current command correction value I*c ((I*d, I*q, I*0) in dq0 rotary coordinate system) outputted from the speed controller 10. Also, a vehicle angular speed ω, a resistance value and an inductance value (neither is shown) of the propulsion coil 61 and the feeder 66 as control constants are inputted at the current controller 24. Compensation operation of the computed voltage value for the voltage reduction by the resistance value and the inductance value is performed and computed voltage command value (Vd, Vq, V0) is outputted.

On the other hand, the output voltage V outputted from the power converter 65 is converted into the voltage (Vd, Vq, V0) in dq0 rotary coordinate system by a three-phase/d-q converter 22, and estimated speed electromotive force value (Zd, Zq, Z0) is computed and outputted by the speed electromotive force observer 25 based on the voltage (Vd, Vq, V0), the current (Id, Iq, I0) and the vehicle angular speed ω. The estimated speed electromotive force value (Zd, Zq, Z0) is obtained by applying observer theory in the modern control theories.

By adding the estimated speed electromotive force value (Zd, Zq, Z0), and the computed voltage command value (Vd, Vq, V0) outputted from the current controller 24 at the adder-subtracter 26, dq-axis voltage command value (V*d, V*q, V*0) is obtained. Then the value (V*d, V*q, V*0) is converted into voltage (Vu, Vv, Vw) in a three-phase alternating current coordinate system by a d-q/three-phase converter 23, and the voltage (Vu, Vv, Vw) is outputted as voltage command value toward the power converter 65.

Figure 2:
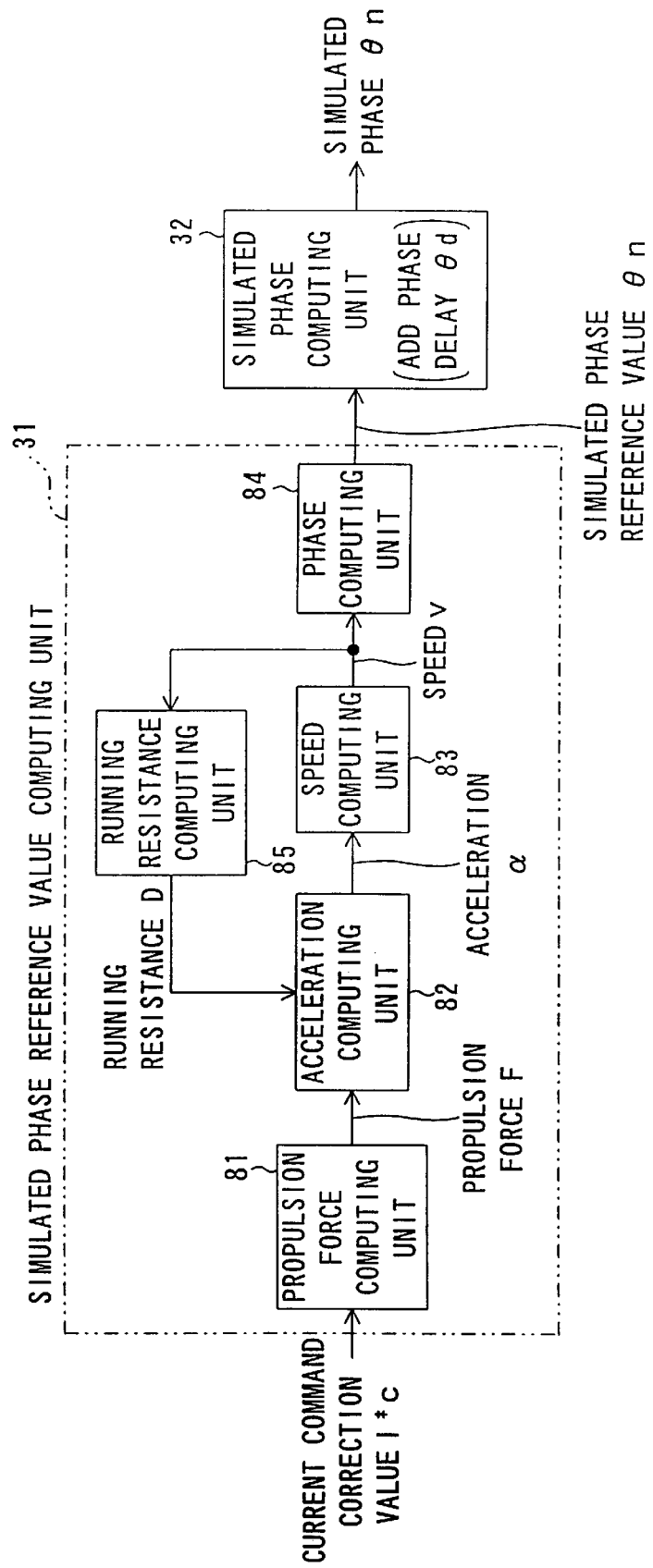
FIG. 2 is a block diagram showing the specific constitution of a simulated phase generator.

The simulated phase generator 30 computes a simulated phase reference value θn' at its simulated phase reference value computing unit 31 based on the current command correction value I*c outputted from the speed controller 10, and computes a simulated phase θn from the simulated phase reference value θn' at its simulated phase computing unit 32. Particularly, as shown in FIG. 2, a propulsion force F is firstly computed by a propulsion force computing unit 81 based on the current command correction value I*c, and an acceleration a is computed by an acceleration computing unit 82 based on the propulsion force F and a running resistance D outputted from a running resistance computing unit 85. Subsequently, a speed v is computed by a speed computing unit 83 based on the acceleration α, and the simulated phase reference value θn' is computed by a phase computing unit 84 based on the speed v. Then, at the simulated phase computing unit 32, a predetermined phase delay θd (30 degrees in the present embodiment) is added to the simulated phase reference value θn' obtained at the simulated phase reference value computing unit 31 to compute the simulated phase θn.

Figure 6:
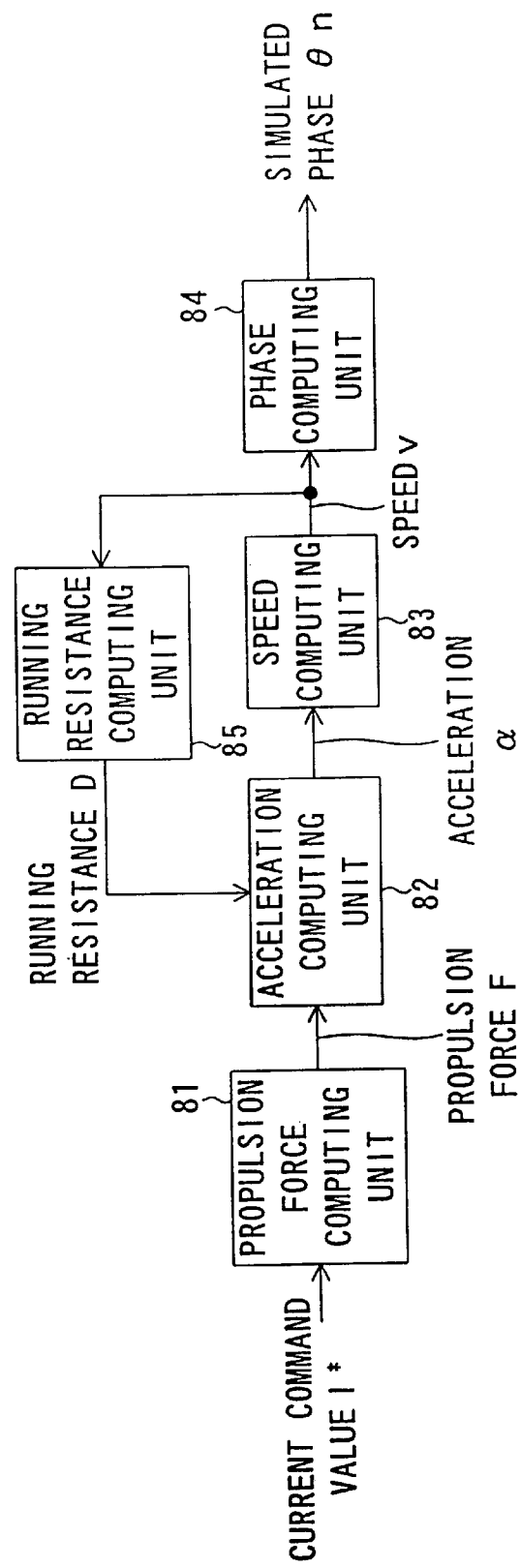
FIG. 6 is a schematic block diagram showing how to compute a conventional simulated phase.

The simulated phase reference value θn' obtained at the simulated phase reference value computing unit 31 is the same as the simulated phase θn according to a conventional method illustrated in FIG. 6. The simulated phase θn according to the present invention is obtained by adding the phase delay θd to the simulated phase reference value θn' (corresponding to the conventional simulated phase θn). As mentioned above, the phase delay θd used for operation at the simulated phase computing unit 32 is also inputted into the correction computing unit 15 in the speed controller 10 to be used for computing the current command correction value I*c, although not shown in the figures.

The phase synchronization controller 40 receives, in a predetermined time cycle (5 msec. in the present embodiment), one of the simulated phase θn, the speed electromotive force phase θe and the position detecting phase θp selected by the input phase switch 55 as a phase signal indicating the vehicle position. The phase deviation between the received phase signal and the presently outputted phase reference θ* is calculated by an adder-subtracter 41, and compensation operation is performed based on the phase deviation at the compensation computing unit 42 to obtain the vehicle angular speed ω. The compensation computing unit 42 is designed as a secondary PI control system, which is a control system for stabilizing an input phase by reducing a steady-state deviation to zero at the time of increasing or decreasing the speed. Integration of the above vehicle angular speed ω is performed at an integrator 43 and the phase reference θ* is outputted.

While input of the phase signal is performed every 5 msec. as mentioned above, inverter control at the power converter 65 is performed according to PWM control, the cycle of which is about 300 Hz. Therefore, it is preferable that the phase reference θ* is outputted in a shorter cycle than the cycle of the PWM control, for example, in a cycle of 200 μsec. The phase reference θ* is outputted to the converter controller 20, the speed electromotive force phase generator 50, and the like as a signal indicating the actual position of the vehicle.

At the compensation computing unit 42, the computed vehicle angular speed θ is also converted into the vehicle speed v, although not shown in the figures. Both the vehicle angular speed ω and the vehicle speed v are outputted through a low-pass filter 56.

Each of the simulated phase θn, the speed electromotive force phase θe and the position detecting phase θp inputted into the phase synchronization controller 40 as the phase signal inherently indicates the vehicle position in the form of phase, and therefore can be used as the phase reference θ* without processing at the phase synchronization controller 40. However, to eliminate the steady-state deviation and obtain a more stable phase reference θ*, these input phases are stabilized at the phase synchronization controller 40 and outputted as the phase reference θ*.

Especially when the speed electromotive force phase θe is used as the phase signal at a lower speed, it is preferably outputted through the phase synchronization controller 40 because a smaller electromotive force and the like often lead to a phase disturbance and a large steady-state deviation from the actual phase.

In the speed electromotive force phase generator 50, a speed electromotive force phase correction amount $\Delta\theta$ is first computed at a speed electromotive force phase correction computing unit 51 based on the estimated speed electromotive force Zd and Zq estimated by the speed electromotive force observer 25. Then, the speed electromotive force phase $\theta e$ is computed by adding the speed electromotive force phase correction amount $\Delta\theta$ and the presently outputted phase reference $\theta^*$ with the adder-subtracter 52.

The input phase switch 55 is to select only one of the simulated phase $\theta n$ generated at the simulated phase generator 30, the speed electromotive force phase $\theta e$ generated at the speed electromotive force phase generator 50 and the position detecting phase $\theta p$ generated at the position detector 68 as the phase signal to be inputted into the phase synchronization controller 40.

Figure 4:
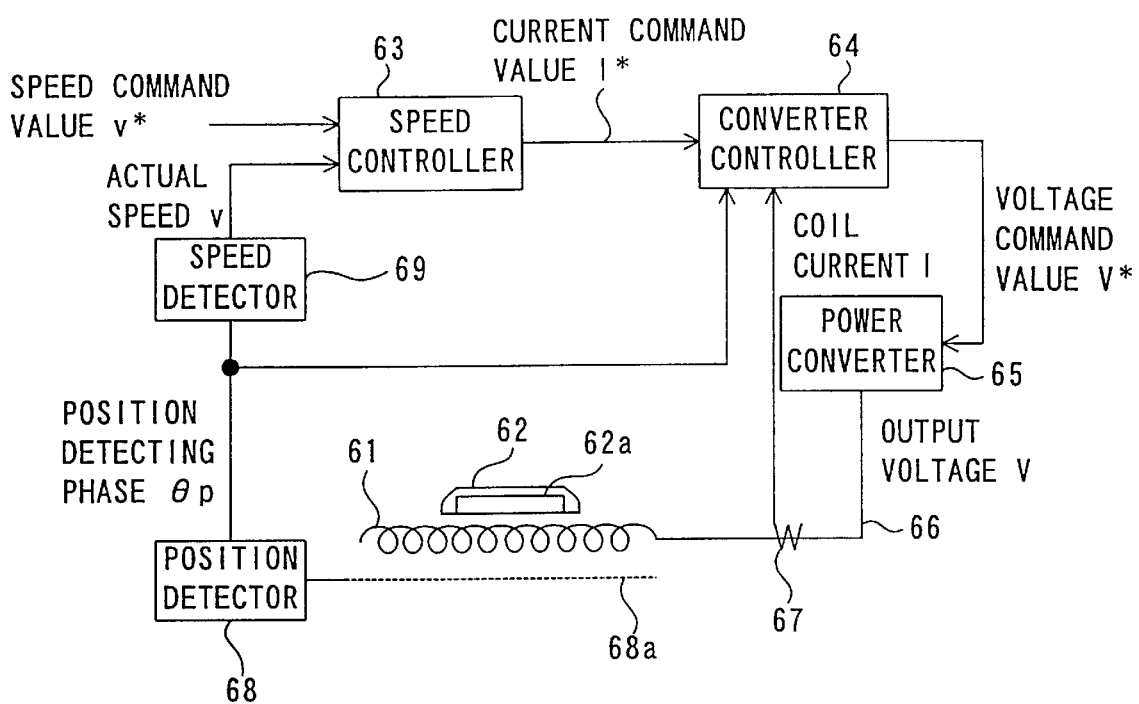
FIG. 4 is a schematic block diagram showing schematically the constitution of a conventional control system for an LSM vehicle.
Figure 5A:
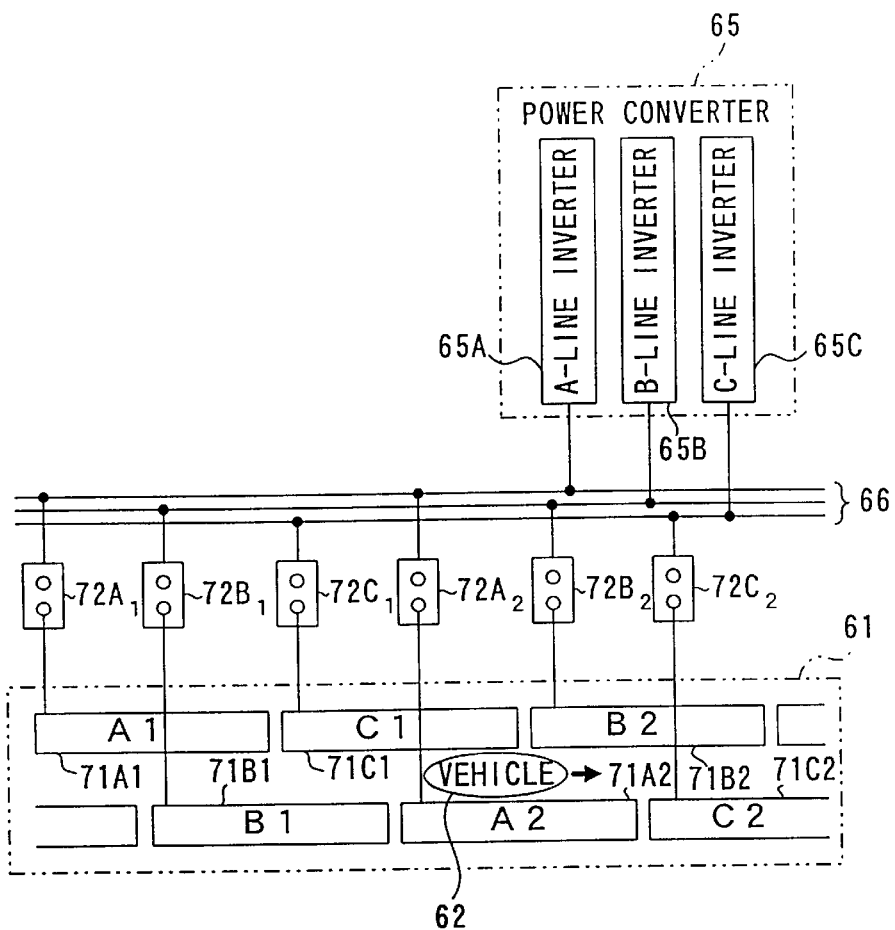
FIGS. 5A and 5B are explanatory views showing a feeder and a propulsion coil in detail.
Figure 5B:
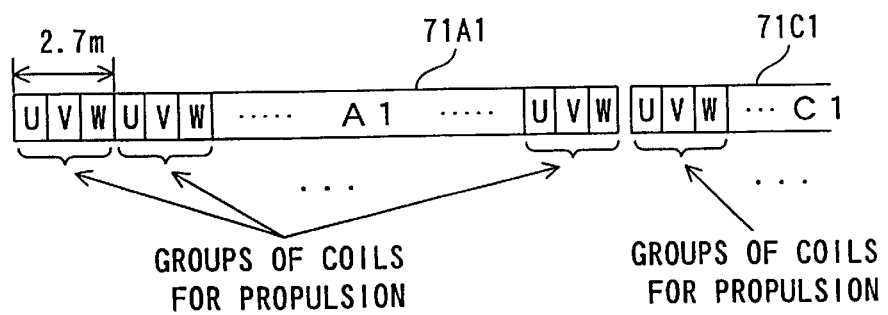

Since all of the propulsion coil 61, the field coil 62a, the power converter 65, the feeder 66, the current detector 67, the cross induction line 68a and the position detector 68 have the same structures, respectively, as described referring to FIG. 4, FIGS. 5A and 5B, the same marks as in FIG. 4, FIGS. 5A and FIG. 5B are applied to these components and explanation thereof is omitted.

As described above in detail, in the control system for an LSM vehicle according to the present embodiment, the simulated phase reference value $\theta n'$ is computed by the simulated phase reference value computing unit 31 based on the current command correction value $I^*c$ obtained by performing correction operation of the current command value $I^*$, and then the predetermined phase delay $\theta d$ (30 degrees) is added to the simulated phase reference value $\theta n'$ at the simulated phase computing unit 32 to output the simulated phase $\theta n$. The simulated phase $\theta n$, which is obtained by theoretic operation based on the current command correction value $I^*c$, can be obtained even at the time of departure of the vehicle 62.

One of the simulated phase $\theta n$, the speed electromotive force phase $\theta e$ generated at the speed electromotive force phase generator 50 and the position detecting phase $\theta p$ generated at the position detector 68 is appropriately selected and inputted into the phase synchronization controller 40 as the phase signal and outputted as the phase reference $\theta^*$. It is to be noted that the phase delay $\theta d$ used at the simulated phase computing unit 32 is valid only when the simulated phase $\theta n$ is used as the phase signal, and that for the rest of the time (when the speed electromotive force phase $\theta e$ or the position detecting phase $\theta p$ is used as the phase signal), the phase delay $\theta d$ is usually set for zero. When the phase delay $\theta d$ is zero, the current command value $I^*$ is equal to the current command correction value $I^*c$, with the result that the current command value $I^*$ is outputted practically as it is from the speed controller 10.

Figure 3:
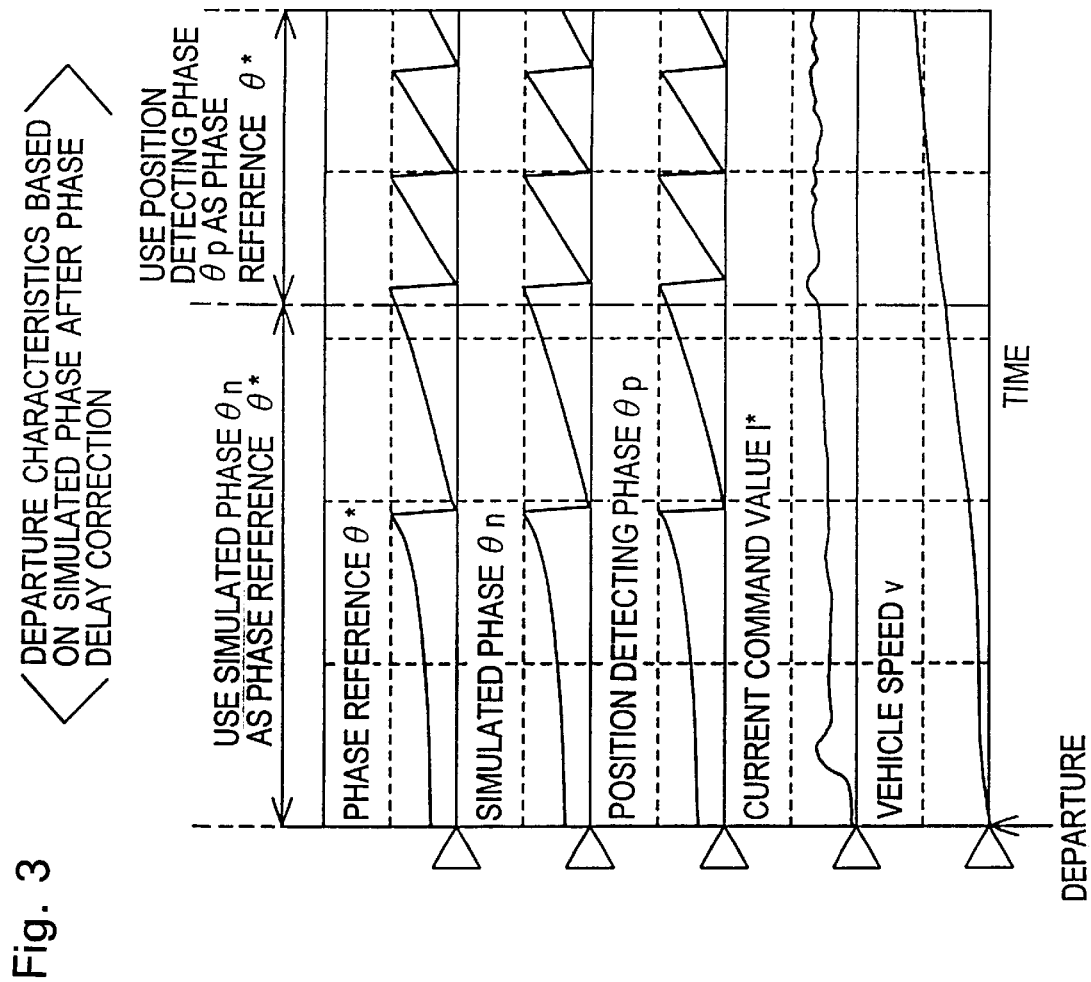
FIG. 3 is an explanatory chart showing a phase reference, a simulated phase, a position detecting phase, a current command value and a vehicle speed when the phase signal is switched over from the simulated phase to the position detecting phase.
Figure 7:
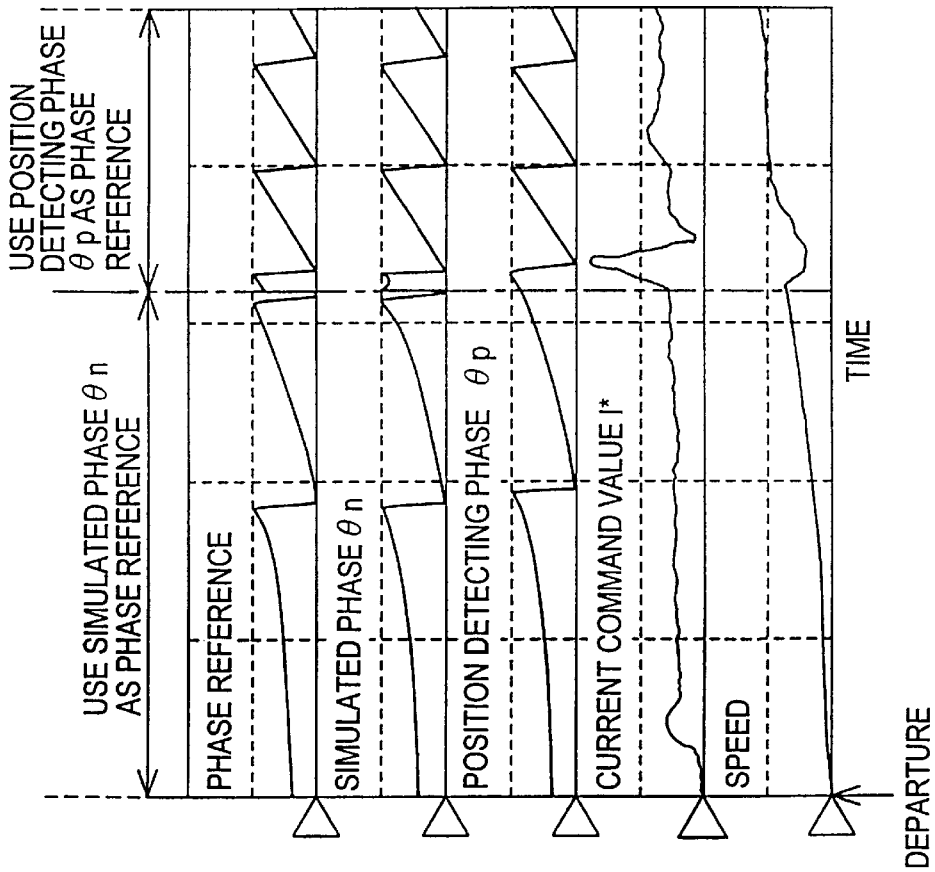
FIG. 7 is an explanatory chart showing a phase reference, a simulated phase, a position detecting phase, a current command value and a vehicle speed when the phase signal is switched over from the conventional simulated phase to the position detecting phase.

FIG. 3 shows an example where, as the input phase, the simulated phase $\theta n$ is used at the time of departure and the position detecting phase $\theta p$ is used once the vehicle has reached a predetermined speed after the departure. Specifically, in this figure, the phase reference $\theta^*$ when the phase signal to be inputted into the phase synchronization controller 40 is switched from the simulated phase $\theta n$ to the position detecting phase $\theta p$ is shown along with the simulated phase $\theta n$, the position detecting phase $\theta p$, the current command value $I^*$ and the vehicle speed v. As can be seen in FIG. 3, the simulated phase $\theta n$ which is obtained by adding the phase delay $\theta d$ to the simulated phase reference value $\theta n'$ presents little difference from the position detecting phase $\theta p$ due to the effect of addition of the phase delay $\theta d$ (synchronizing force), compared with the conventional simulated phase $\theta n$ (cf. FIG. 7). As a result, even when a switchover from the simulated phase $\theta n$ to the position detecting phase $\theta p$ is performed, the vehicle speed v and the current command value $I^*$ hardly change. That is, a more stable switchover can be achieved.

Also in the not shown case where, as the phase signal, the simulated phase $\theta n$ is used at the time of departure and the speed electromotive force phase $\theta e$ is used once the vehicle has reached a predetermined speed after the departure, the phase deviation between the simulated phase $\theta n$ and the speed electromotive force phase $\theta e$ is little, and therefore a stable switchover of the input phase with little change of the vehicle speed v and the current command value $I^*$ is possible.

As is apparent from the foregoing description, according to the control system for an LSM vehicle in the present embodiment, wherein the simulated phase $\theta n$ is obtained by adding the phase delay $\theta d$ to the simulated phase reference value $\theta n'$ theoretically obtained at the simulated phase reference value computing unit 31, and wherein the simulated phase $\theta n$ is used through the phase synchronization controller 40 as the phase reference $\theta^*$, the phase deviation between the simulated phase $\theta n$ and the actual phase can be substantially reduced by the operation of synchronizing force. Thus, characteristics at the time of departure such as speed characteristics and acceleration characteristics are stabilized, that is, the speed, the acceleration, the coil current, and the like hardly change even when the phase reference $\theta^*$ is switched over from the simulated phase $\theta n$ to another phase (for example, the position detecting phase $\theta p$ or the speed electromotive force phase $\theta e$).

Furthermore, in this system, even in the transition immediately after the departure when synchronization is not accomplished, shortage of the propulsion force due to the phase deviation $\theta d$ at the time of departure can be sufficiently compensated for because the current command correction value $I^*c$ inputted into the simulated phase generator 30 to compute the simulated phase $\theta n$ is computed by the operation according to the above equation ($I^*c=I^*/\cos\theta d$) and is larger than the current command value $I^*$, and thus earlier synchronization can be achieved while keeping the speed and the acceleration stabilized.

Therefore, it is possible to improve reliability of the whole control system if the system is designed such that, as the phase signal, the position detecting phase $\theta p$ is usually used and the simulated phase $\theta n$ or the speed electromotive force phase $\theta e$ is used instead when the position detecting phase $\theta p$ cannot be obtained due to some trouble of the position detector 68 or the like.

Although the present invention has been described in connection with a preferred embodiment, it is to be clearly understood that the invention is not limited to the present embodiment but may be embodied in a variety of ways without departing from the scope of the invention, which should be determined with reference to the claims.

For example, while one of the simulated phase $\theta n$, the speed electromotive force phase $\theta e$ and the position detecting phase $\theta p$ is selected as the phase signal in the above embodiment, it is possible to use, as the phase signal, the simulated phase $\theta n$ at the time of departure when the speed electromotive force is not generated and the speed electromotive force phase $\theta e$ instead when the vehicle has reached a predetermined speed after the departure. This arrangement dispenses with the ground installations, such as the position detector 68 and the cross induction line 68a, and therefore leads to a great economic advantage.

Also, the phase delay $\theta d$ to be added to the simulated phase reference value $\theta n'$, which is 30 degrees in the present embodiment, may be set for another appropriate value, such as the optimal value based on the results of actual vehicle runs and simulations so that the phase deviation between the simulated phase θn and the actual phase will be made small due to synchronizing force.

In the present embodiment, the current command correction value I*c is outputted from the speed controller 10 to the current controller 24 and the simulated phase generator 30 when any one of the simulated phase θn, the speed electromotive force phase θe and the position detecting phase θp is used as the phase signal. However, an alternative arrangement may be possible such that the current command correction value I*c is outputted only when the simulated phase θn is used as the phase signal and the current command value I* is outputted without intervention of the correction computing unit 15 when the speed electromotive force phase θe or the position detecting phase θp is used as the phase signal.

What is claimed is:

1. A departure control system using a simulated phase in a control system for driving a linear synchronous motor vehicle wherein a propulsion coil is arranged along a guideway on a ground, a field coil is provided on the vehicle so as to face the propulsion coil, a current command value I* is outputted by speed controlling means, and an output voltage is outputted to the propulsion coil by power converting means based on the current command value I* and a phase reference indicating a relative position of the field coil to the propulsion coil in the form of an electrical angle, the departure control system generating said phase reference at the time of departure of the vehicle and comprising:

simulated phase reference value generating means for generating a simulated phase reference value based on said current command value I*; and simulated phase generating means for computing a simulated phase θn by adding a predetermined phase delay θd to said simulated phase reference value and outputting the simulated phase θn as said phase reference.

2. The departure control system using a simulated phase according to claim 1, wherein said simulated phase reference value generating means includes:

a propulsion force computing unit for computing propulsion force based on said current command value I*;

a running resistance computing unit for computing running resistance based on the present speed;

an acceleration computing unit for computing acceleration based on said propulsion force and said running resistance;

a speed computing unit for computing said speed based on said acceleration; and a phase computing unit for computing said simulated phase reference value based on said speed computed by said speed computing unit.

3. The departure control system using a simulated phase according to claim 1, further comprising current command value correcting means for outputting a current command correction value I*c obtained by increasing said current command value I* by a predetermined amount so as to compensate for a shortage of the propulsion force of the vehicle immediately after the departure, wherein said power converting means outputs an output voltage to said propulsion coil based on said current command correction value I*c and said phase reference, and wherein said simulated phase reference value generating means generates said simulated phase reference value based on said current command correction value I*c.

4. The departure control system using a simulated phase according to claim 3, wherein said current command value correcting means obtains said current command correction value I*c by performing operation according to the following equation based on said current command value I* and said phase delay θd: I*c=I*/cos θd.

* * * * *